(12) United States Patent
Courtney

(10) Patent No.: US 6,878,228 B2
(45) Date of Patent: Apr. 12, 2005

(54) VENEER FACE PLYWOOD FLOORING AND METHOD OF MAKING THE SAME

(75) Inventor: Richard Courtney, Vicksburg, MS (US)

(73) Assignee: Capella Engineered Wood, LLC, Vicksburg, MS (US)

( * ) Notice: Subject to any disclaimer, the term of this patent is extended or adjusted under 35 U.S.C. 154(b) by 0 days.

(21) Appl. No.: 10/753,415

(22) Filed: Jan. 9, 2004

(65) Prior Publication Data

US 2004/0142144 A1 Jul. 22, 2004

Related U.S. Application Data

(63) Continuation of application No. 09/903,549, filed on Jul. 13, 2001, now Pat. No. 6,695,944.
(60) Provisional application No. 60/218,666, filed on Jul. 17, 2000.

(51) Int. Cl.$^7$ ................................................ B32B 31/00
(52) U.S. Cl. ...................... 156/257; 156/252; 156/253; 156/196; 156/263; 156/268; 144/346
(58) Field of Search ................................ 156/196, 252, 156/253, 257, 263, 268; 144/346, 345, 24.1, 24.11

(56) References Cited

U.S. PATENT DOCUMENTS

| 4,655,869 | A | 4/1987 | Tellman et al. |
| 4,973,507 | A | 11/1990 | Horian |
| 5,506,026 | A | 4/1996 | Iwata et al. |
| 6,004,648 | A | 12/1999 | Snyder |
| 6,224,704 | B1 | 5/2001 | Bassett et al. |
| 6,695,944 | B2 | 2/2004 | Courtney |

Primary Examiner—Linda L Gray
(74) Attorney, Agent, or Firm—Patton Boggs LLP

(57) ABSTRACT

The present invention provides a wood board for use as flooring panels and a method of making the wood board. The wood board has the strength and outer surface finish of hardwood boards, increased flexibility, and a lower cost than hardwood boards. The wood board of the present invention comprises a core layer having plural veneer layers oriented such that longitudinal grain structures of adjacent layers are perpendicular with respect to each other, and each veneer having longitudinal pierced slots placed therein oriented in parallel with their respective longitudinal grain structures; and a longitudinally sliced face layer placed upon the inner core layer. This wood board and flooring panel of the present invention have high strength, high flexibility and superior surface smoothness. Further, the present invention provides lower manufacturing costs and thus lower costs for the consumer.

31 Claims, 2 Drawing Sheets

SKETCH OF PIERCING MACHINE

SKETCH OF PIERCING MACHINE

VENEER FACE PLYWOOD FLOORING AND METHOD OF MAKING THE SAME

CROSS-REFERENCES TO RELATED APPLICATIONS

This application is a continuation of U.S. patent application Ser. No. 09/903,549, filed Jul. 13, 2001, now U.S. Pat. No. 6,695,944, which claims priority to U.S. Provisional Application No. 60/218,666, filed Jul. 17, 2000, the complete disclosures of which are herein incorporated by reference.

TECHNICAL FIELD AND INDUSTRIAL APPLICABILITY OF THE INVENTION

The present invention relates to fabricated wood to be used as flooring panels having the strength and outer surface finish of traditional hardwood boards, but exhibiting increased flexibility, and a lower cost than similar boards. The present invention further comprises a method of manufacturing the same.

BACKGROUND OF THE INVENTION

The shortage of resources for providing good quality lumber to be used for domestic purposes, such as solid hardwood floors, has forced the pricing of such products to be high. In response to these high costs, attempts have been made to manufacture wood flooring panels from other less expensive resources. Flooring panels manufactured using these types of wood typically comprise a core layer constructed from a plurality of single rotary cut sheets of veneer or the like. These sheets are layered on top of each other such that the grain directions thereof are perpendicular to one another to impart strength and rigidity, and bonded together. Additionally, a single rotary cut or strand board veneer sheet made from the same or different wood material, may be bonded on the surface of these core panels to provide an aesthetic finish, as disclosed in Iwata et al. U.S. Pat. No. 5,506,026.

However, upon manufacturing floor panels from individual sheets as described above, some amount of shrinkage of the sheets typically occurs from the effects of weather and aging after completion of the manufacturing process, and after the panels have been placed for use. Further, due to the above effects, the panels tend to move and create cracks or crevices in the floor. This leads to instability in the flooring and sometimes buckling of the individual floor panels. Further, although these types of wood flooring materials can provide rigidity similar to solid hardwood floor boards, when the various adjacent layers are positioned with their grain directions at 90 degrees with respect to one another, additional drawbacks occur. These drawbacks include a lack of flexibility in the finished product.

Thus, in the wood flooring industry, there is a need for affordable flooring panels having the strength found in hardwood flooring panels, with a greater amount of stability, flexibility, and high quality surface finish.

SUMMARY OF THE INVENTION

The present invention provides fabricated wood boards, and a process for manufacturing the same. In particular, the present invention provides wood boards comprised of a multi-layer core and a face layer comprised of a longitudinally sliced wood veneer laminated to at least one surface of said core layer. The core is formed of a laminate of layers of wood veneer, with successive layers positioned such that the direction of the grains therein are perpendicular to one another. Further, the plural, perpendicularly layered, veneers within said core layer include longitudinally pierced slots formed therein such that said pierced slots are parallel with the longitudinal grain structures of said veneers. Such perpendicularly layered pierced veneers can also be used in plywoods lacking a longitudinally sliced veneer. Moreover, various forms of chip board, particle board, and masonite can optionally be used to form internal layers of the fabricated wood boards. The high quality manufactured wood of the invention can be used in the manufacture of wood products such as flooring and furniture.

The present invention further includes a method for manufacturing wood boards comprising the steps of (1) forming a core layer by (a) preparing a back veneer having longitudinally pierced slots therein oriented in parallel with its longitudinal grain structures, (b) placing one or more additional veneer layers each having longitudinally pierced slots therein oriented in parallel with their respective longitudinal grain structures, upon said back veneer such that the longitudinal grain structures of each pair of adjoining veneer layers are perpendicularly oriented with respect to each other and are adhered to one another with glue, and (c) placing a surface or veneer "face" formed of longitudinally sliced wood veneer, upon the exposed surface of said one or more additional veneer layers, such that the longitudinal grain structures of said surface veneer and said exposed veneer sheet of said core layer each are perpendicularly oriented with respect to each other, and are adhered to one another with glue.

The foregoing and other features, aspects, and advantages of the present invention will become more apparent from the following detailed description when read in conjunction with the accompanying figures.

DETAILED DESCRIPTION OF A PREFERRED EMBODIMENT OF THE INVENTION

Figure 1:
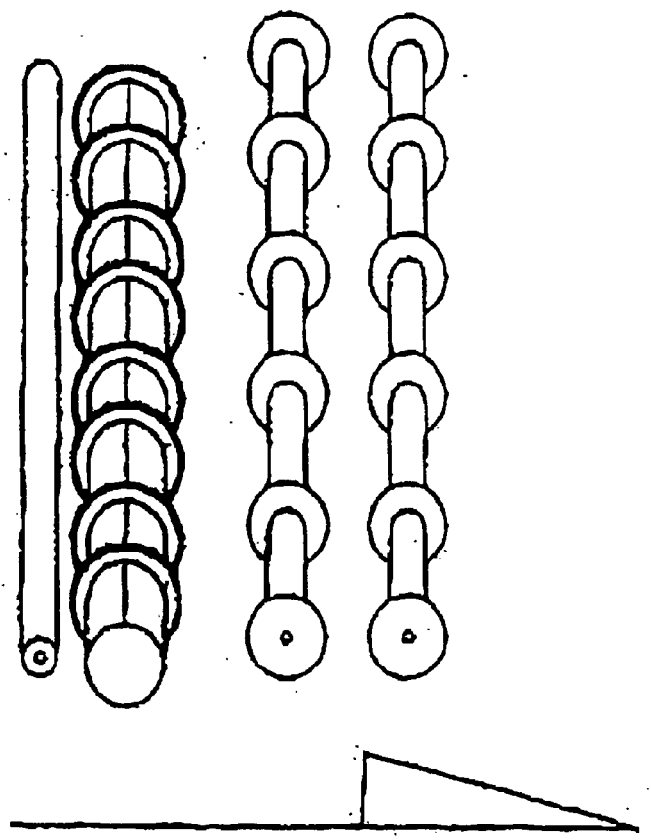
FIG. 1 provides a diagram of a suitable piercing tool and roller setup for performing the piercing process of the present invention.
Figure 1:
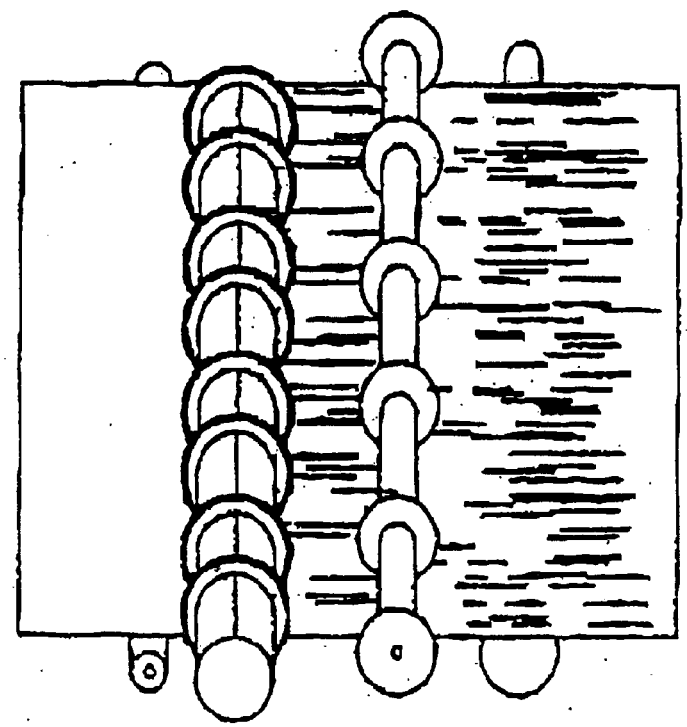

The present invention provides a fabricated wood product composed of a longitudinally sliced veneer face sheet and a core comprised of one or more successively layered wood veneers. This wood product is useful, for example, as wood flooring panels. These wood boards are preferably designed to have a thickness from 0.375 inches to about 0.75 inches, but may vary depending upon their usage. Preferably, the successively layered veneers used for the core layer are arranged in such a manner that the direction of the longitudinal grains in each successive veneer are placed at 90 degrees from that of the preceding veneer to provide maximum strength. The number, type and/or thickness of the veneer sheets forming the core can be varied as desired to regulate the thickness and physical properties of the resulting panels.

Each of the veneers within the core layer are pierced (or perforated) with longitudinal slots parallel to the grain direction, which are used to provide a partial separation of the connective wood fiber between the longitudinal grains. As a result of placement of these longitudinal slots in the veneer sheets, there is a decrease in the amount of shrinkage in which the finished product experiences due to environmental effects, thus increasing stability in each finished wood board. The pierced longitudinal slots also result in an increase in flexibility of the individual veneer sheets, and hence an increase in the flexibility of the finished wood boards made from the same. Furthermore, these longitudinally pierced slots provide numerous regions for adhesives to settle into while bonding the individual veneer sheets together, thus providing a greater bonding area, and consequently a higher degree of strength in the finished product. The resulting product is unexpectedly flexible compared to other high quality solid flooring. This is surprising since the panels have such dimensional stability. The flexibility permits unexpectedly better installation parameters compared with high quality solid flooring. For example, the resulting product of the invention can be glued to the floor in which it is to be permanently fixed as an alternative to nailing, whereas prior art flooring panels have typically been limited to nailing in place due to their limited flexibility.

The sliced veneers that form the wood board face, and that may also be used within the core layer, may be produced from sawn hardwood square or rectangular sections referred to as a flitch. The hardwood flitch may be prepared for slicing by placing it into an insulated chamber and heating it by direct contact with steam or heated water or a combination of both. The flitch is preferably heated to uniform temperature of about 175° F., and maintained at this temperature for a period of about 36 to 40 hours. The heated flitch is then removed from the heating chamber and may then be passed through a breakdown system which trims the ends square and cross cuts the flitch into nominal lengths (e.g. 8 foot lengths are common). The 8 foot flitch may then be passed through a sizing planner to remove any accumulation of foreign material on the surfaces and provide final thickness size. The sized flitch may then be passed through a longitudinal slicer which moves the flitch across a fixed knife to remove a single piece of veneer at a predetermined thickness, for example, from one thousandth to thirty thousandths of an inch thickness. However, the longitudinal slicer can be adjusted to produce a veneer sheet of any thickness depending on the desired wood board to be manufactured. The remainder of the flitch may then be conveyed around the machine and passed back through the slicer until all usable material of the predetermined thickness is removed from the flitch. The remainder, or unusable material may be conveyed to a waste system and processed into wood chips or hogged material for boiler fuel. The single strips of sliced veneer are accumulated into bundles and may then be transported to a feeder for entry into a steam heated veneer dryer. The feeder can be any standard design veneer feeder. The sliced veneer strips may then be passed through a veneer dryer where the moisture content is reduced to an average of 6 to 8% by weight. The dry veneer slices may then be graded into face grade, center grade, and back grade and stacked into bundles. The sliced veneer bundles may then be transported to a forced air ventilation storage area for cooling and moisture equalization. These sliced veneer bundles usually will remain in the cooling equalization storage area for approximately 14 days. After cooling, the sliced veneer strips may bemused to make veneer sheets.

To make such sheets, the sliced face veneers may be passed through a standard trimmer machine for trimming the longitudinal edges into a parallel plane to prepare for entry into a splicing system. The edge-trimmed pieces may be passed through the edge-gluing machine wherein they are glued along their respective edges to form veneer sheets of desired width for the face veneer. The center grade and back grade sliced veneers on the other hand, may be passed through a standard trimmer machine for trimming the longitudinal edges into a parallel plane with respect to each other, and then passed through a piercing machine to place perforated longitudinal slots into the veneer sheets. Further, upon exiting the piercing machine, the veneer sheets may be sent through an offset roller setup for stretching and thus reinforcing the slots. This offset roller arrangement may be performed by providing a row of rollers that traverse the width of the veneer as it enters the offset arrangement, and further providing a second row of rollers that traverse the width of the veneer sheet as it exits the first set of rollers. This second row of rollers is offset from the first row such that each roller in the second row is positioned in front of and between two rollers in the first row. As the veneer traverses each row of rollers it is stretched to help prevent the slots from closing. As a result of piercing and stretching the veneer sheets, they experience a partial separation of connective wood fiber between the longitudinal grains. This separation appears to add to the flexibility of the final product.

The slot piercing process can be performed on each type of veneer, for example, longitudinally sliced veneer and rotary sliced veneer, to be used for inner core plies and back plies. The purpose of the piercing and subsequent stretching is not to remove wood fiber from the veneer sheets, but to separate connective wood fibers between the longitudinal grain structures in a precise pattern normal to the pierced slot openings. This process is preferably performed on the veneer sheets after they have been dried to an average 6 to 8% moisture content and gone through the normal 8 to 11% tangential shrinkage process. Such piercing has been found to relieve shrinkage stress in the veneer sheets, retard further shrinkage or swelling due to changes in ambient conditions, and reduce movement during the subsequent gluing, machining, and finishing process; with the final product being structurally stable while maintaining strength and the necessary flexibility for its intended end use.

FIG. 1 provides a schematic of one type of a piercing tool and roller configuration of a suitable piercing machine. The piercing function is performed by passing the veneer between an upper powered shaft equipped with circular piercing tools. The contact points on the circular piercing tool are sized and spaced to allow perforations of a desired size, and spacing to be made into the veneer sheets. For example, contact points imparting penetrations of about 0.375 inches in length, about 0.125 inches in width and spacing of about 0.375 inches axially and 0.750 inches transversely (referenced from the longitudinal axis of the grain structures) have been found to work well. The separated connective fibers will spring back together to partially close the approximately 0.125 inch width. The contact points on the piercing tool may be configured to allow entry into the veneer with a beginning and ending approach angle which allows a double tapered slot to be pierced into the veneer sheets. The slots will be closed at the beginning and can taper to a maximum width of, for example, approximately 0.125 inches at the mid-point while tapering to a close at the exit end.

The contact points will pierce the veneer sheets preferably while pressing them against a powered urethane covered shaft which assists in providing conveyance of the veneer sheets, and also provides an anvil for the circular piercing tool to work against. As the sheets exit the piercing tool, they may be passed through a series of offset rollers to stretch and work the sheets. For example, a pair of powered drive rolls, preferably covered with a resilient material such as urethane can be used to propel the sheets through a series of powered circular shafts equipped with solid circular tires, preferably of high density urethane. The tires are spaced in such a manner that the tires on the upper powered shaft are directly above the gaps between the tires on the lowered powered shaft. The lowest tangent point on the upper tires will be adjustable to allow downward placement so the lowest tangent point will be below the uppermost tangent point of the lower tires. The upper tires will then extend downward into a gap between the lower tires producing a bending moment at 90 degrees to the longitudinal grain structure and the pierced slots in the veneer. This bending moment will further separate the pierced slots in the connective wood fiber and reduce the elastic properties of the veneer sheets. This treatment results in the unexpected property that low value woods such as sweet gum can be used to produce flooring that is dimensionally stable. Generally such low value woods are expected to produce a veneer that is susceptible to bending and twisting and which is unsuitable for such applications. However, after processing as described, it has been found that even such low value woods are useful as a veneer sheet in flooring and other types of plywood. Upon exiting this process the sheets may be transported to an edge gluing system where individual veneer pieces are glued together along their edges to form veneer sheets of desired width.

After forming the perforated and non-perforated veneer sheets, they can then be assembled into the fabricated boards of the present invention by layering and gluing the individual veneer sheets on top of one another as follows.

LAYERING PROCESS

Figure 2:
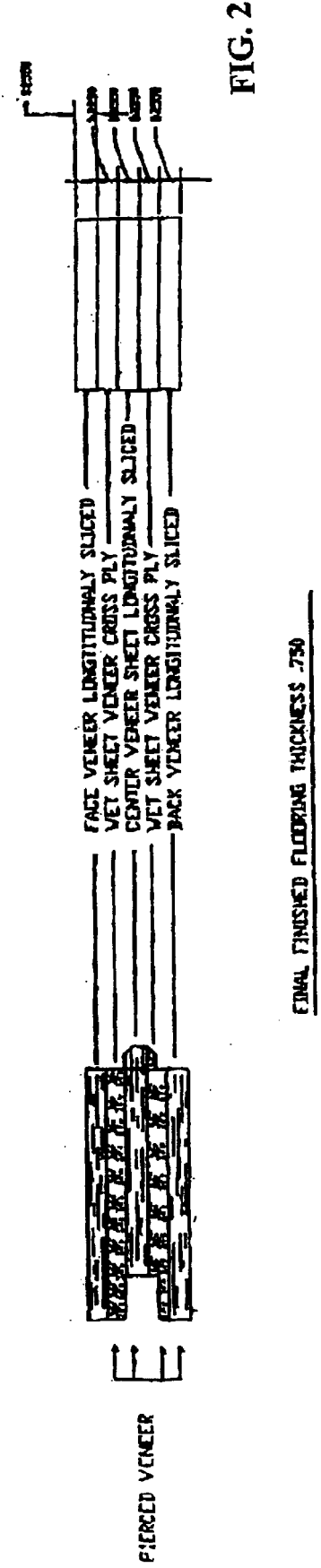
FIG. 2 details the individual layers of a preferred wood board of the present invention.

Any number of veneers may be layered upon each other to form the core inner layer of the panels depending upon the thickness and physical properties desired from the resulting panels. Further, any combination of longitudinal sliced veneer and rotary cut veneer, or only longitudinally sliced veneer, or only rotary cut veneer may be used to form the core inner layer of the panels. However, in a preferred embodiment of the invention, the individual layers of the core veneers alternate between longitudinally sliced and rotary cut veneers as shown in FIG. 2. In this embodiment, a pierced back grade sliced veneer is placed on the conveyor with its side that was previously facing the knife of the longitudinal slicer (herein referred to as the "tight side") facing down. A pierced rotary cut wood veneer is coated with a suitable glue, e.g., a standard 60–65% solid urea formaldehyde glue mixture, on both sides. Alternatively, the glue may be applied to any of the veneer surfaces as desired. The coating thickness of the glue is controlled by a glue spreading machine to provide a consistent uniform coating of both upper and lower surfaces of the veneer. The glue coated veneer (herein referred to as "wet"), with its tight side up, is placed upon the back grade layer such that the longitudinal grain structures of each veneer are at 90 degree angles with respect to each other. The next veneer is a pierced sliced veneer which has been formed, as described previously, by edge gluing longitudinally sliced wood veneer strips together. This veneer is placed tight side down with its longitudinal grain structure at 90 degrees to the preceding glue coated veneer. The next veneer is preferably a second rotary cut pierced wood veneer which is passed through the glue spreading machine and coated on both surfaces. This "wet" veneer is placed upon the preceding layer with its tight side up. Thus, the tight side of one veneer faces the tight side of a second veneer. Alternatively, the tight side of the first and second veneer face away from each other. In this manner, the imperfections and stress of the two veneers cancel each other out. This can be important for canceling out the stress and imperfections of the rotary or sliced veneers, either separately or together. The longitudinal grain structures of these two adjacent layers are at 90 degrees with respect to each other. The final veneer, provided a common 5-ply panel is desired to be produced, is an edge glued sliced veneer face sheet which is placed upon the preceding sheet with its tight side up. For flooring or high quality wood, this final longitudinal sliced face veneer does not have longitudinal pierced slots contained therein for purposes of retaining a smooth surface finish without imperfections or marks on its surface. Consequently, each of the respective veneers has their longitudinal grain structures at 90 degrees with respect to the preceding veneer. Further, although glue coating both sides of the second and fourth veneer sheets provides a convenient means of gluing the sheets together, one of skill in the art will readily understand that any method of applying glue between the veneer layers can be utilized.

The constructed wood board may then be placed into an unheated press and clamped at a force sufficient to force the glue placed between the veneer layers to spread evenly across the veneer layers and through the pierced slots such that the glue exhibits a continuous flowing pattern through all of the piercing slots within the veneers. In other words, these pierced slots will act to combine all glue lines and therefore provide additional surface and/or bonding area for the completed panel. Typically a force from about 200 to 300 PSI, for a period from about 15 to 20 minutes is sufficient. The pre-pressing process also forces any entrapped air out of the glue joints while the pressure creates a slight thermal reaction to promote tack in the glue lines. This process provides advantages over a normal five-ply panel such as, for example, in a normal five-ply panel, the panel is limited in that the bonding area exists only between each of the five sheets. Consequently, the glue between one layer of veneer sheets does not flow through the sheets and connect with the glue between another layer. This means that a change in condition of any one veneer sheet can cause failure of the panel, or post bowing or twisting of the final product produced. Furthermore, where the glue used is stronger than the wood, it further increases the strength of the wood.

Following the pre-press cycle, the panel may be placed into a heated final press to set and cross link the adhesive. This press typically clamps the panel at a pressure of from about 200 to 300 PSI, forcing the glue through the pierced slots at a greater degree of pressure, and is heated to a temperature set point of approximately 240–260° F., depending on the adhesive used, to allow for cross linking and final flow. The panel remains clamped in the press for a predetermined time period (e.g. about 6 to 8 minutes is sufficient) and may then be removed from the clamp mechanism and placed into a climate controlled area for cooling and equalization.

Figure 3:
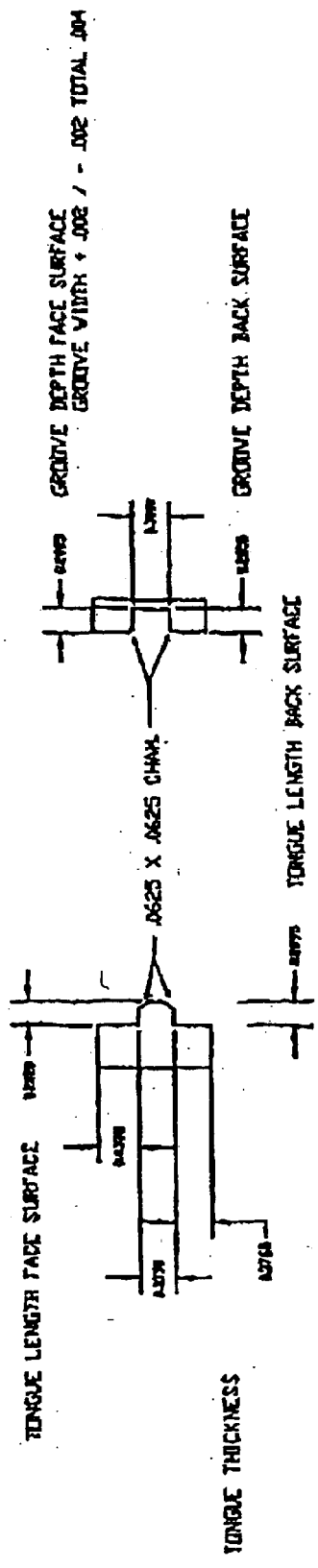
FIG. 3 details a wood board of the present invention having a tongue and groove attachment means formed therein.

The cooled panels are removed from storage and may then be transported to a trim and rip area. During this process, each panel is trimmed to remove raw edges, and subsequently passed through a bottom and top sanding unit to size the panel to a uniform thickness. This thickness can vary depending on the panel thickness desired. Upon exit from the sanding process each panel may then move through a rip saw unit which separates them into strips of a predetermined width. These strips may then be conveyed to an edger unit which machines a tongue and groove profile into the side edges (longitudinal dimension) of the strips, as shown in FIG. 3.

Upon exit from the edger each strip may then be conveyed to a defect removal and end machining unit where defects are removed while the tongue and groove profile are machined into the ends of the strip. Upon exit from the end machining unit the strips are inspected, wherein rejects are routed back to the proper station for re-manufacturing while acceptable products are assembled into groups for entry into the finish line.

The assembled strips enter the finish line through a final top and bottom head sanding unit to insure final product thickness and proceed through a series of stain coating, sealer coating, abrasion resistant coating, sealer coating, final sanding of the sealer, final top coating and curing. Upon exit from the finish line, the product receives a final inspection and is packaged for shipment.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by persons of ordinary skill in the art having reference to this description. It is contemplated that all such changes and additional embodiments are within the spirit and true scope of the invention as claimed below.

What is claimed is:

1. A method for manufacturing wood boards comprising the steps of: (a) forming a core inner layer by: (1) preparing a back veneer sheet having longitudinally pierced slots therein oriented in parallel with its longitudinal grain structures; and (2) adhering one or more additional veneer sheets, each having longitudinally pierced slots therein oriented in parallel with its respective longitudinal grain structures, upon said back veneer sheet to form a stack of layered veneer sheets wherein the longitudinal grain structures of each veneer sheets are perpendicularly oriented with respect to each other; and (b) adhering a longitudinally sliced wood veneer face layer on said core inner layer such that the longitudinal grain structures of said face layer veneer are perpendicularly oriented with respect to the longitudinal grain structures of the proximate core inner layer veneer sheet to which it is attached; wherein said pierced slots do not cause appreciable expansion of the resulting wood board.

2. A method according to claim 1, wherein said core inner layer is comprised of longitudinally sliced wood veneer sheets.

3. A method according to claim 1, wherein said core inner layer comprises successively oriented longitudinally sliced wood veneer sheets and rotary cut wood veneer sheets.

4. A method according to claim 3, wherein said core inner layer comprises alternating layers of longitudinally sliced wood veneer sheets and rotary cut wood veneer sheets.

5. A method according to claim 1, wherein said core inner layer is oriented such that the tight side of each successive veneer sheet faces in an opposite direction from the preceding veneer sheet.

6. A method according to claim 1, wherein said core layer is oriented such that the tight side of each successive pair of layers face each other.

7. A method according to claim 1, wherein said core layer is oriented such that the tight side of each successive pair of layers face away from each other.

8. A method according to claim 1, wherein said core inner layer has an even number of veneer sheets.

9. A method according to claim 1, wherein the finished thickness of said wood boards is from about 0.375 to about 0.750 inches.

10. A method according to claim 9, further comprising the step of cutting said wood boards into strips suitable for wood flooring.

11. A method according to claim 10, wherein said strips have a width of up to three and one quarter inches.

12. A method according to claim 11, wherein said wood veneer face layer has a thickness of about 0.15 inches.

13. A method according to claim 1, wherein said wood veneer face layer has a thickness of about 0.15 inches.

14. A method according to claim 1, wherein said core inner layer is comprised of successively oriented rotary cut wood veneer sheets.

15. A method according to claim 1, wherein said core inner layer comprises successively oriented longitudinally sliced wood veneer sheets or rotary cut wood veneer sheets.

16. The method according to claim 1, wherein the wood veneer has been dried to an average 6% to 8% moisture content prior to placing the pierced slots therein.

17. A method according to claim 16, wherein said core inner layer is comprised of longitudinally sliced wood veneer sheets.

18. A method according to claim 16, wherein said core inner layer comprises successively oriented longitudinally sliced wood veneer sheets and rotary cut wood veneer sheets.

19. A method according to claim 18, wherein said core inner layer comprises alternating layers of longitudinally sliced wood veneer sheets and rotary cut wood veneer sheets.

20. A method according to claim 16, wherein said core inner layer is oriented such that the tight side of each successive veneer sheet faces in an opposite direction from the preceding veneer sheet.

21. A method according to claim 16, wherein said core layer is oriented such that the tight side of each successive pair of layers face each other.

22. A method according to claim 16, wherein said core layer is oriented such that at least one tight side of a layer faces a tight side of a successive layer.

23. A method according to claim 16, wherein said core layer is oriented such that the tight side of each successive pair of layers face away from each other.

24. A method according to claim 16, wherein said core inner layer has an even number of veneer sheets.

25. A method according to claim 16, wherein the finished thickness of said wood boards is from about 0.375 to about 0.750 inches.

26. A method according to claim 25, further comprising the step of cutting said wood boards into strips suitable for wood flooring.

27. A method according to claim 26, wherein said strips have a width of up to three and one quarter inches.

28. A method according to claim 27, wherein said wood veneer face layer has a thickness of about 0.15 inches.

29. A method according to claim 16, wherein said wood veneer face layer has a thickness of about 0.15 inches.

30. A method according to claim 16, wherein said core inner layer is comprised of successively oriented rotary cut wood veneer sheets.

31. A method according to claim 16, wherein said core inner layer comprise successively oriented longitudinally sliced wood veneer sheets or rotary cut wood veneer sheets.

* * * * *